Jan. 3, 1933. F. BISZANTZ 1,893,124
INVERTIBLE MANIFOLD AND VALVE FOR HYDRAULIC HOISTS
Filed Feb. 25, 1930  2 Sheets-Sheet 1
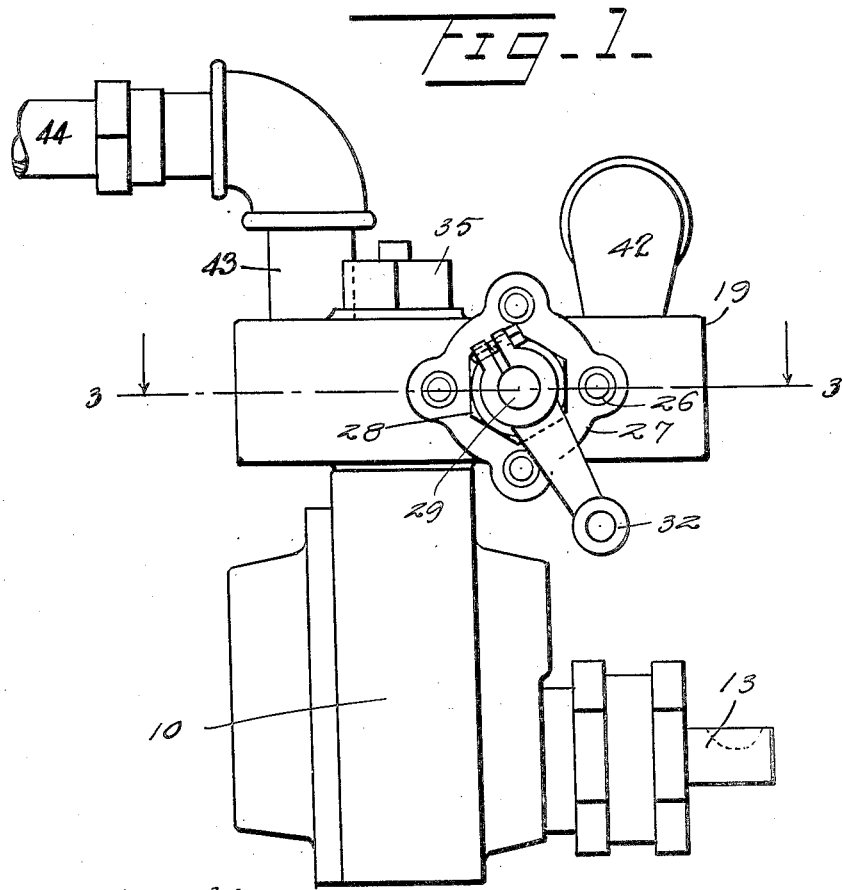
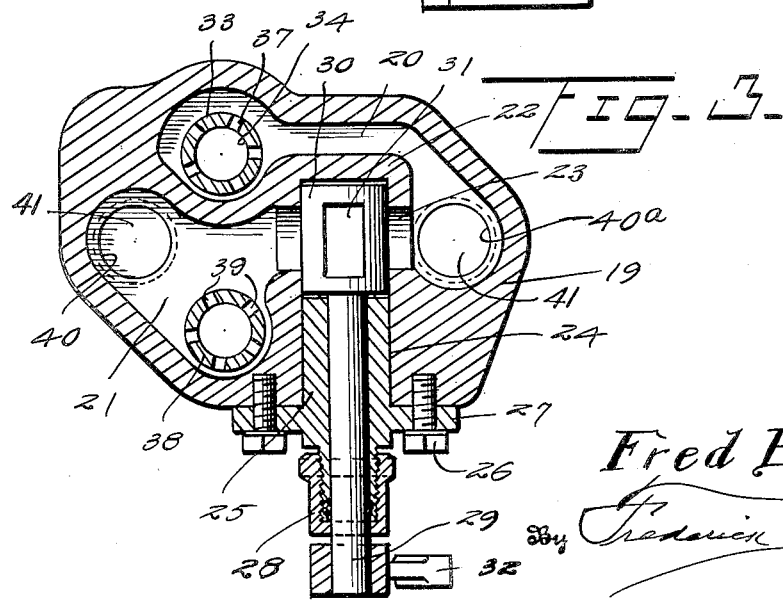

Jan. 3, 1933.  F. BISZANTZ  1,893,124
INVERTIBLE MANIFOLD AND VALVE FOR HYDRAULIC HOISTS
Filed Feb. 25, 1930  2 Sheets-Sheet 2
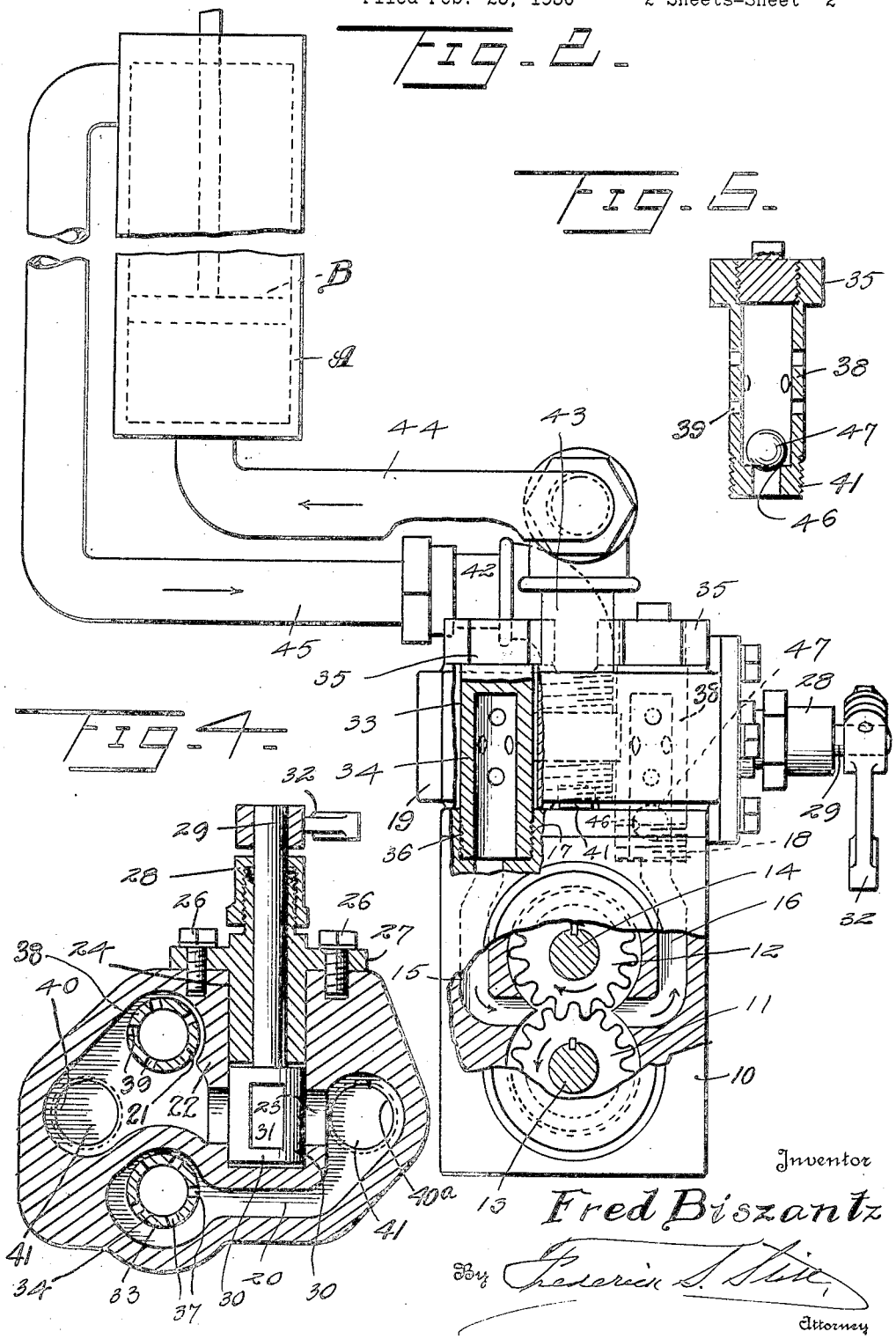
Inventor
Fred Biszantz
By Frederick S. ...
Attorney Patented Jan. 3, 1933

1,893,124

UNITED STATES PATENT OFFICE

FRED BISZANTZ, OF GALION, OHIO, ASSIGNOR TO THE CENTRAL OHIO STEEL PRODUCTS COMPANY, OF GALION, OHIO, A CORPORATION OF OHIO

INVERTIBLE MANIFOLD AND VALVE FOR HYDRAULIC HOISTS

Application filed February 25, 1930. Serial No. 431,318.

This invention relates to trucks having tilting bodies and particularly to those trucks wherein the body is tilted by a hydraulic hoist including a pump, a cylinder and a piston operating in the cylinder and operatively connected to the tilting body of the truck, such a truck being shown in my co-pending application for patent, Serial Number 431,317, filed on the 25th day of February, 1930.

Motor truck frames today usually have means in their transmission gear cases for attaching thereto another small housing containing one or more gears for transmitting power from the engine through proper shafts and universal joints for the purpose of driving other mechanism, such as the hoisting mechanism of various types of dump bodies. Owing to the different constructions of different motor trucks, these auxiliary driving shafts will run clockwise in some makes of trucks and counter-clockwise in others. Where a gear pump is used, as in a hydraulic hoist for tilting the dump body, this difference in direction of rotation of the driving shaft will in one case drive the fluid in one direction and in the other case drive it in the opposite direction if the same gear were used in each case as the driving gear. As a consequence of this, manufacturers are compelled to furnish two different pump designs to overcome this handicap of reversing the direction of flow of the liquid, these two different designs providing that in one case, the driving shaft connects to one of the pump gears, while in the other case, this shaft connects to the mating gear.

The general object of the present invention is to provide means such that only one design of pump, driving in all cases the lower gear of the pump, need be used, whether the driving shaft turns in one direction or the other, and more particularly to provide a manifold forming an intermediate unit between the pump and the cylinder, which manifold when placed in one position will accommodate a pump driving in one direction and which when placed in another position, and differently connected up, will permit the pump to drive in the other direction and more specifically to provide a structure of this character wherein the manifold merely has to be inverted in order to properly operate the piston without regard to the direction of movement of the driving gear of the pump.

A further object is to provide a manifold of this character which will permit the use of the simple form of gear pump having only two ports and without regard to the direction of rotation which may be given to the driving gear of the pump.

A further object is to provide means whereby the two ends of the cylinder may be communicatively connected to each other without the liquid passing through the pump to permit the pump to operate if desired so that the pressure on opposite sides of the piston of the fluid in the cylinder may be equalized by flowing at any desired speed from beneath the piston to the top of it while the body is coming down to road position by gravity.

Other objects will appear in the course of the following description.

My invention is illustrated in the accompanying drawings, wherein:—

Figure 1 is an elevation of a pump housing, my manifold mounted thereon, and a portion of the connections to the cylinder;

Figure 2 is an elevation partly in section, the elevation being at right angles to the elevation in Figure 1, the view diagrammatically showing the connections of the manifold to the cylinder, the pump housing being partly broken away and the manifold being partly broken away;

Figure 3 is a section on the line 3—3 of Figure 1 with the parts arranged as shown in Figures 1 and 2;

Figure 4 is a section of the same character as Figure 3, but showing the manifold inverted;

Figure 5 is a vertical sectional view through one of the tubular studs showing the ball valve.

Referring to these drawings and particularly to Figures 1 to 3, 10 designates the housing of an ordinary pump which, as illustrated in Figure 2, has the two intermeshing pump gears 11 and 12. The pump gear 11 is shown as being mounted upon the shaft 13, which shaft is the driving shaft. This shaft is supposed to be turning in a counter-clock-wise direction in Figure 2, while obviously the shaft 14 upon which the pump gear 12 is mounted will turn in a clockwise direction, thus drawing in liquid through the intake port or passage 15 and expelling the liquid through the outlet passage 16. These passages 15 and 16 extend to the upper face of the pump housing and open into interiorly screw-threaded recesses 17 and 18.

So far I have described a typical form of pump commonly used in connection with hydraulic hoists, the shaft 13 being operatively connected to driving means, in turn connected to the engine or motor as previously referred to.

My manifold includes the casing or housing 19 which is most clearly shown in Figure 3. The housing is formed to provide two chambers 20 and 21 separated from each other by a wall 22. This wall is apertured as at 23 and extending in through one side of the housing 19 is a bore 24 which intersects the passage or aperture 23 and has seated therein, the gland or sleeve 25 held in place by screws 26 passing through the flange 27 of the gland or sleeve. A suitable packing cap 28 is mounted upon the extremity of the gland 25 and through the gland 25 passes a shaft 29 carrying at its inner end the cylindrical valve 30 provided with a transverse aperture or port 31. In the position illustrated in Figure 3, the valve is turned so that this port 31 extends at right angles to the passage 23 but by operating the handle 32, the stem of the valve may be turned so as to carry the valve into such position that its port will register with passage 23. As illustrated, this port 31 is out of register with the passage 23 and prevents any communication between the chambers 20 and 21.

The upper and lower walls of the manifold immediately above one end of the chamber 20 are provided with alined openings 33. Adapted to be disposed through these alined openings is a hollow stud shown in longitudinal section in Figure 5 and designated 34. This stud has a length greater than the depth of the housing 19 and one end of the stud is provided with a head 35 and the opposite end of the stud is exteriorly screw-threaded as at 36 to engage with the screw-threads of the recess 17 in the upper wall of the pump housing.

This hollow stud 34 is perforated at a plurality of points as at 37. The upper and lower walls of the chamber 21 are also provided with upper and lower openings precisely like the openings 37 through which passes a hollow stud 38 constructed in the same manner as the stud 34. This is provided with a head of the same character as the head 35 and at its lower end is screw-threaded for engagement with the appropriate screw-threaded recess 17 in the pump housing. This stud is perforated as at 39.

The upper and lower walls of the chamber 20 at the opposite end from the stud 34 are formed with opposed openings 40 and the chamber 21 is also provided with upper and lower openings 40ª. With the parts in the position shown in Figure 2, the openings 40 in the lower wall of the chambers 21 and 20 are closed by screw-threaded plugs 41 as shown most clearly in Figure 2 while the upper openings in these two chambers are connected respectively to pipes 42 and 43. The pipe 43 is connected to a pipe 44 which leads into the forward end of the cylinder A while the pipe 42 is connected to a pipe 45 which leads from the rear end of the cylinder. The cylinder A is provided with a piston B having a piston rod which is operatively connected to the hoisting mechanism as shown most clearly in my co-pending application, Serial No. 431,317, filed on the 25th day of February, 1930.

It is sufficient to say that when liquid is admitted through the pipe 44 into the forward end of the cylinder A, the piston B is forced outward and the dump body is tilted upward to discharge the load and that as the dumping body is lowered, the piston B will move forward or toward the inlet end of the cylinder.

So far as described, the action of this manifold will be as follows:—

The port 16 which is the discharge port of the pump will be communicatively connected to the plug 38. This plug is formed with a seat 46 upon which a ball check valve 47 seats (see Figure 5). This ball check valve obviously permits the inlet of fluid to the hollow stud 38, but prevents any return of the fluid into the pump. The fluid discharged by the pump through the hollow stud 38 will be discharged into the chamber 21 and then outward through the opening 48 in the top wall of the chamber 21 into the pipe 43, out through pipe 44 into the forward end of the cylinder A. The pump will, of course, draw liquid through the hollow stud 34 from the chamber 20 and from the pipe 45 and thus from the rear end of the cylinder A so that as the piston B is being forced forward by the liquid impelled from the pump, the liquid in advance of the piston B is being withdrawn and carried to the inlet port of the pump. The valve 30 during this operation of hoisting is turned to the position shown in Figure 3. When now it is desired to lower the body, that has been hoisted to its full extent, the valve 30 is turned so that its port 31 is in alinement with the passage 23, whereupon obviously the liquid in the forward portion of the cylinder can flow back along pipe 44 and the pipe 43 through the stud 38 into the chamber 21, then through the port 31 and passage 23 into the chamber 20 and through the hollow stud 34 back into the rear portion of the cylinder, thus permitting the body to return to its fully lowered position by gravity. Obviously by rotating the valve 30, more or less toward a fully opened position, the speed of descent of the body may be checked.

It will be understood that as the piston rises to its full extent within the cylinder A, that is, as the piston nears the rear end of the cylinder, it will uncover a port in the side of the cylinder leading to the pipe 45 so that after the cylinder has passed the port leading into the cylinder from pipe 45, the piston B may be retained at the rear end of the cylinder either by stopping the pump entirely, without, of course, turning the valve 31 from the position shown in Figure 3, or preferably by continuing the rotation of the pump so that liquid will pass into the lower end of the cylinder up toward the upper or rear end thereof beneath the piston out through the lateral port into the pipe 45 and thus return.

I have not attempted to illustrate in this drawing, the means whereby the lateral port is opened and the liquid behind the piston at this point as well as the liquid in front of the piston which is carried off through the port 45 as there are various ways of accomplishing this end and it has nothing to do with my present invention.

I have heretofore described the application of this manifold to a case where the lower pump gear 11 is rotating in a counter-clockwise direction and the upper pump gear is operating in a clock-wise direction. Where the lower pump gear 11, however, rotates in a clockwise direction and the upper pump gear in a counter-clockwise direction, it is obvious that the port 15 will become the eduction port while the port 16 will become the inlet port for the pump and that under these circumstances, the manifold, if it is arranged as shown in Figure 2, would not properly operate.

My manifold is so arranged, however, that it may be inverted and when inverted will connect the port 15 with the inlet end of the cylinder and the port 16 with the outlet end of the cylinder. This arrangement of the manifold is shown in Figure 4. Now when this equipment is placed upon some other make of motor truck where the lower gear will operate in the opposite direction from that shown in Figure 2, then in this case, the pipes 42 and 43 are disconnected from the manifold, the studs 34 and 38 are unscrewed, and the manifold turned bottom side up as shown in Figure 4. The plugs 41 which under these circumstances will be on top are removed and replaced in what is now the bottom wall of the manifold. The hollow stud 38 with the ball check valve 47 is replaced in the same hole in the manifold from which it came, which means that it will screw into the opposite pump port from that shown in Figure 2. In other words, the studs 34 and 38 will be replaced in the same holes in the manifold in all cases, but will be changed from one to the other of the pump ports, depending upon the direction of flow. Of course, under these circumstances, and with this change the manifold will cause the flow through the pipes 44 and 45 in precisely the same direction shown in Figure 2. The only difference will be that the stud 38 having the ball check valve will be disposed to engage the left hand port 15 in Figure 2 while the stud 34 will be disposed to connect with the right hand port 16 in Figure 2. The two pipes 42 and 43, however, will have exactly the same relation as they had before. While I prefer to turn the manifold over from one side to the other so that the screw-threaded openings for connecting with pipes 42 and 43 will always remain in exactly the same relation and location and these pipes may be always reconnected without any change of form, yet with a slight change in this pipe, the manifold might be turned over from front to rear or from rear to front and get the same result.

It will be seen that when this manifold is turned over, the lever 32 for operating the valve 30 will always be in approximately the same lowered position, in which position it always operates in the same way, turning the valve 30 to close the passage 23 while hoisting or opening this passage 23 for lowering the body. It will be seen that I have provided a manifold of an extremely simple construction which is so formed as to permit the use of a simple form of gear pump having only two ports, with any hydraulically operated truck body, and without regard to the direction of movement of the pump, the manifold being so constructed that it will always direct the high pressure fluid into the pipe 43 and draw its fluid from the pipe 45, the return of the piston being controlled by a simple form of stop cock or valve 30.

The piston as previously stated is to be operatively connected to the hoisting mechanism as is illustrated in my pending application for patent, Serial No. 431,317, filed on the 25th day of February, 1930, but I do not wish to be limited to this as obviously the manifold might be used in connection with other piston operating mechanisms either for hydraulically operated hoists or other structures without departing from the spirit of the invention as defined in the claims and that minor changes might be made in the details of construction and arrangement of the parts without departing from the spirit of the invention.

I claim:—

1. A manifold for communicatively connecting a rotary pump with a hoisting cylinder, the manifold having a pair of inlet ports, and a pair of outlet ports and having cylinder ports for communicatively connecting the interior of the manifold with opposite ends of the cylinder, and chambers communicatively connecting one cylinder port with one pair of inlet ports and the other cylinder port with the pair of outlet ports, and means for closing either one of the inlet and outlet ports and communicatively connecting the other inlet and outlet ports to the pump, and means whereby fluid may be by-passed through the manifold from one of the cylinder ports to the other cylinder port after passing through the pump ports.

2. A manifold for communicatively connecting a rotary pump with a hoisting cylinder, the manifold being formed to provide two chambers, each chamber having two cylinder ports, either one of the ports of one chamber being adapted to be connected to the inlet of the cylinder and either one of the ports of the other chamber being adapted to be connected to the other end of the cylinder, means for closing that port of each chamber not connected to a cylinder, each chamber having two pump ports, either port of a chamber being adapted to be communicatively connected to the inlet port of a pump and either port of the other chamber being adapted to be communicatively connected to the outlet port of the pump, and means for closing either pump port in each chamber.

3. A manifold for communicatively connecting a rotary pump with a hoisting cylinder, the manifold being formed to provide two chambers, each chamber having two cylinder ports, either one of the ports of one chamber being adapted to be connected to the inlet of the cylinder and either one of the ports of the other chamber being adapted to be connected to the other end of the cylinder, means for closing that port of each chamber not connected to a cylinder, each chamber having two pump ports, either port of a chamber being adapted to be communicatively connected to the inlet port of a pump and either port of the other chamber being adapted to be communicatively connected to the outlet port of the pump, means for closing either pump port in each chamber, and a valve whereby the chambers may be communicatively connected to each other or separated from each other.

4. A manifold for communicatively connecting a rotary pump with a hoisting cylinder, the manifold having upper and lower walls and being formed to provide two chambers, each chamber being formed with registering ports in its opposite walls, either one of which is adapted to be connected to the inlet and outlet respectively of the said cylinder, means for closing that port of each chamber which is not connected to the cylinder, said means being adapted to be inserted through either wall of the manifold, each chamber having two alined ports in its opposite walls and hollow plugs each screw-threaded at one end and adapted to be disposed in either direction through the last named ports with their screw-threaded ends in engagement with the inlet and outlet ports of the pump, said plugs being hollow and having apertures opening into the respective chambers, one of said plugs having a check valve therein, opening away from the pump to which the plug is to be connected.

5. A manifold for communicatively connecting a rotary pump with a cylinder, the manifold having upper and lower walls and being formed to provide two chambers, each chamber being formed with registering ports in its opposite walls, either one of which is adapted to be connected to the inlet and outlet respectively of the said cylinder, means for closing that port of each chamber which is not to be connected to the cylinder, said means being adapted to be inserted through either wall of the manifold, each chamber having two alined ports in its opposite walls and hollow plugs each screw-threaded at one end and adapted to be disposed in either direction through the last named ports with their screw-threaded ends in engagement with the inlet and outlet ports of the pump, said plugs being hollow and having apertures opening into the respective chambers, one of said plugs having a check valve therein, opening away from the pump to which the plug is to be connected, and a passage connecting said chambers, and a manually operable valve in said passage, in one position cutting off communication between said chambers and in another position permitting said communication.

6. A manifold for communicatively connecting a rotary pump with a hoisting cylinder, the manifold being formed to provide two chambers, each chamber at one end having two alined pump ports in its opposite walls, the wall of each port being screw-threaded whereby the ports in either wall may be connected to pipes connecting opposite ends of the cylinder with the manifold, screw-threaded plugs for closing the opposite ports and the manifold, each chamber having alined oppositely disposed pump ports in its opposite walls, plugs having a length greater than the thickness of the manifold and adapted to extend through said pump ports from one side of the manifold to the other, each plug being hollow and provided at one end with a head and at the other end being screw-threaded to engage with the interior screw-threads of a pump port to hold the manifold upon the pump and afford communication between the interior of the corresponding chamber and the corresponding port of the pump, said plugs being perforated, one of said plugs having a seat in its interior, and a check valve resting upon said seat.

7. A manifold for communicatively connecting a rotary pump with a hoisting cylinder, the manifold being formed to provide two chambers, each chamber at one end having two alined pump ports in its opposite walls, the wall of each port being screw-threaded whereby the ports in either wall may be connected to pipes connecting opposite ends of the cylinder with the manifold, screw-threaded plugs for closing the opposite ports and the manifold, each chamber having alined oppositely disposed pump ports in its opposite walls, plugs having a length greater than the thickness of the manifold and adapted to extend through said pump ports from one side of the manifold to the other, each plug being hollow and provided at one end with a head and at the other end being screw-threaded to engage with the interior screw-threads of a pump port to hold the manifold upon the pump and afford communication between the interior of the corresponding chamber and the corresponding port of the pump, said plugs being perforated, one of said plugs having a seat in its interior, and a check valve resting upon said seat, the chambers being connected by a passage in the interior of the manifold, and a rotatable valve extending into the manifold through one side wall thereof and intersecting said passage, the valve having a port whereby when the valve is turned in one direction, the port will aline with said passage and when turned in the other direction, the port will cut off said passage.

8. A manifold for communicatively connecting a rotary pump with a hoisting cylinder, the manifold having means whereby it may be connected to the pump in either of two bodily different positions of the manifold, said means comprising means whereby, in either of these positions, the inlet and outlet from the hoisting cylinder may be connected respectively to the inlet and outlet of the pump through the manifold in such a way as to secure unidirectional flow through the manifold irrespective of the direction of rotation of the pump, and means in the manifold whereby fluid may be bypassed through the manifold from one cylinder port to the other, without passing through the pump.

9. A manifold disposed between and adapted to communicatively connect a rotary pump to a hoisting cylinder and secure unidirectional flow into the cylinder on the hoisting stroke irrespective of the direction of rotation of the pump, the manifold having two chambers, each of said chambers having a pair of pump ports and a pair of cylinder ports and means for closing either one of the pump ports in either chamber, and either one of the cylinder ports in either chamber and communicatively connect the open pump port in each chamber to the pump and the open cylinder port in each chamber to the cylinder, the manifold being bodily shiftable whereby a selected port of one chamber may be connected with one port of the pump and a port of the other chamber with the other port of the pump and one of the cylinder ports of one chamber may be connected to one port of the cylinder and one of the cylinder ports of the other chamber with the other port of the cylinder.

FRED BISZANTZ.